(12) United States Patent
Coleman et al.

(10) Patent No.: US 7,722,224 B1
(45) Date of Patent: May 25, 2010

(54) ILLUMINATING DEVICE INCORPORATING A HIGH CLARITY SCATTERING LAYER

(75) Inventors: Zane Coleman, Somerville, MA (US); Timothy Kelly, Boston, MA (US); Mark Chu, Somerville, MA (US)

(73) Assignee: Fusion Optix, Inc., Woburn, MA (US)

( * ) Notice: Subject to any disclaimer, the term of this patent is extended or adjusted under 35 U.S.C. 154(b) by 25 days.

(21) Appl. No.: 11/958,361

(22) Filed: Dec. 17, 2007

Related U.S. Application Data (60) Provisional application No. 60/870,262, filed on Dec. 15, 2006.

(51) Int. Cl.
*G02F 1/335* (2006.01)
(52) U.S. Cl. .................. 362/326; 362/615; 362/619
(58) Field of Classification Search .......... 362/600–630
See application file for complete search history.

(56) References Cited

U.S. PATENT DOCUMENTS

| | | | |
|---|---|---|---|
| 4,188,657 A | | 2/1980 | Reibling |
| 5,685,939 A | | 11/1997 | Wolk et al. |
| 5,727,870 A | | 3/1998 | Grierson |
| 5,932,342 A | | 8/1999 | Zeira et al. |
| 6,141,149 A | * | 10/2000 | Carlson et al. ............. 359/500 |
| 6,522,373 B1 | * | 2/2003 | Hira et al. ................ 362/603 |
| 6,568,835 B2 | | 5/2003 | Wijbenga |
| 6,723,444 B2 | * | 4/2004 | Kobayashi et al. .......... 428/480 |
| 7,108,406 B2 | * | 9/2006 | Moriyasu et al. ........... 362/427 |
| 7,380,962 B2 | * | 6/2008 | Chaves et al. .............. 362/293 |
| 2004/0080938 A1 | * | 4/2004 | Holman et al. ............. 362/231 |
| 2004/0114355 A1 | | 6/2004 | Ritzkin et al. |
| 2005/0018428 A1 | | 1/2005 | Harvey |
| 2006/0056021 A1 | | 3/2006 | Yeo et al. |
| 2006/0056166 A1 | | 3/2006 | Yeo et al. |
| 2006/0082989 A1 | | 4/2006 | Wang |
| 2006/0227546 A1 | | 10/2006 | Yeo et al. |
| 2006/0290253 A1 | | 12/2006 | Yeo et al. |

FOREIGN PATENT DOCUMENTS

WO 2006026743 A1 3/2006

* cited by examiner

*Primary Examiner*—Anabel M Ton (57) ABSTRACT

The present invention provides improved optical elements, such as light diffusing films, plates, and lenses, which can be used in light-emitting devices, such as light fixtures to control the distribution of light projected onto illuminated objects, such as walls, sculptures, and landscaping. Compared to traditional light scattering films, plates or lenses, improvements in illuminance uniformity, optical throw, system efficacy, and aesthetic appearance are achieved. Embodiments of the invention utilize region(s) of volumetric asymmetric diffusion that allow a partial quantity of light to be transmitted without significant scattering in order to improve optical throw and illuminance uniformity. Embodiments can also eliminate hotspot and thus improve the illuminated uniformity.

20 Claims, 8 Drawing Sheets

| Test Configuration → | (a) Std 16° Secondary Optics Only | (b) Addition of 20° Symmetric Diffuser | (c) Addition of 40° Symmetric Diffuser | (d) Addition of Fusion Optix MOD Lens™ |
|---|---|---|---|---|
| Digital Image → |  |  |  |  |
| False Color Intensity Plots → |  |  |  |  |
| C = Optical Throw | 36" | 12.9" | 6.4" | 29.3" |
| W = Horizontal Full Beam Spread (FWHM) | 12.9" | 18.8" | 19.5" | 24.4" |
| L = Vertical Half Beam Spread (HWHM) | 28" | 24.8" | 20.6" | 20.9" |
| Illumination Uniformity | 71% | 67% | 63% | 88% |
| Relative Average Luminous Intensity | 100% | 92% | 84% | 94% |
| Relative Peak Brightness | 100% | 90% | 93% | 88% |

FIG. 8

| Film | Thickness | Diffusion Angle (FWHM) | Transmission | Haze | Clarity |
|---|---|---|---|---|---|
| 20° Symmetric Diffuser | 392 µm | 20° x 20° | 93% | 98% | 4% |
| 40° Symmetric Diffuser | 225 µm | 40° x 38° | 91% | 100% | 2.8% |
| Fusion Optix MOD Lens™ | 76 µm | 27° x 6° | 89% | 91% | 16% |

FIG. 9

ILLUMINATING DEVICE INCORPORATING A HIGH CLARITY SCATTERING LAYER

RELATED APPLICATIONS

This application claims the benefit of priority under 35 U.S.C. 119(e) to co-pending U.S. Provisional Application No. 60/870,262, filed on Dec. 15, 2006, the entire contents of which is incorporated herein by reference. This application also references U.S. patent application Ser. Nos. 11/426,198, 11/223,600, 11/282,551 and PCT/US05/31276 (Publication Number WO 2006/026743), the entire contents of each are incorporated herein by reference.

FIELD OF THE INVENTION

The invention generally relates to an enhanced diffuser plate or film, optical element, method of manufacture, and its use in illumination applications, and more specifically its use in illumination applications where the distribution pattern of light onto objects is important. Architectural lighting contains many such applications.

BACKGROUND

The invention relates to the improved optical performance of light fixtures and optical elements, systems and other light-emitting devices whose primary function is to illuminate a region. Light fixtures are also commonly referred to as luminaires and represent a complete lighting unit consisting of lamp(s) and electrical controls (when applicable), together with the parts designed to distribute the light, to position and protect the lamps, and to connect the lamps to the power supply. Within the broad field of illumination, a category of light fixtures exists designed for applications commonly referred to as architectural lighting. Applications within the scope of the architectural lighting category include but are not limited to building façade lighting, wall washing, wall grazing, architectural flood lighting, architectural accent lighting, interior large-area lighting, interior accent lighting, back lighting, spot lighting, cove lighting, gallery lighting, landscape lighting, tree lighting, structure and bridge lighting, sculpture lighting, and urban landscape lighting. The invention is particularly well suited to architectural lighting and other applications where control of light output is important in illuminating objects by spreading substantially uniform light onto a surface over a distance.

LED Based Luminaires

Within the category of architectural lighting fixtures, solid-state lighting (SSL) or light-emitting diode (LED) fixtures utilize LEDs or organic LEDs (OLEDs) as light sources. The advantages of LEDs as light sources are well documented and include long life, high efficacy, and emission of narrow band colored light. For optical control over the light, the small area source of the light flux allows for the greater degree of control (more efficient control) over the light than that from fluorescent or extended light sources. Additionally, LEDs can be dimmed or cycled off and on without significantly adversely effecting performance or lifetime. Red, green, and blue LEDs can be connected with electronic controllers to adjust light output and provide a dynamic or adjusting color changing light output from a fixture.

Secondary Optics

The output from LEDs and LEDs plus components are typically near-Lambertian in angular luminous intensity output or have primary or secondary optics that reduce the angular intensity profile to a more narrow symmetrical profile. In near-Lambertian luminaries, the angular intensity profile typically distributes light to angular regions where it is not desired or needed, such as the high angles. This effectively reduces the efficiency because of the loss of light directed into the un-desired angular directions. In order to increase the angular intensity within a desired angular range, typical LED architectural lighting fixtures utilize secondary optic lenses that collimate light in narrow (such as a Full-Width at Half Maximum (FWHM) angular intensity of 12 degrees) symmetric beam patterns with an increased light flux within an angular range close to the normal to the plane of emission (optical axis) from the LED. The narrow symmetric beam patterns created by the angular light redistribution (collimation) through reflection from metallic surfaces or total internal reflections plus refraction typically have significantly higher light intensities in the central angular regions, such as a Gaussian-like light intensity distribution. These collimating optics are designed to provide a reduced angular distribution (more light closer to the zero illumination angle) and typically result in non-uniform illuminance from the non-uniform angular intensity.

Custom Secondary Optics

Secondary optics, such as reflectors or lenses or refractors, positioned in close proximity to the LEDs can be designed to provide a more custom, uniform light intensity distribution. However, the optics would need to be very specific to the application; and they are costly to manufacture, requiring custom molds that would likely need to be changed for each type of luminaire and each type of LED. Additionally, depending on the location of the LED in the array within the luminaire, the intensity distribution may need to be customized for each position within the array such that the light distribution from each LED overlaps to create a more uniform color and luminance

Light Directed Normal to the Primary Plane of Illumination

When typical LED architectural lighting fixtures are directed at an angle normal to a planar primary illumination surface such as a wall, the illuminance is non-uniform, decreasing rapidly from the central region. For example, an overhead luminaire with an array of LEDs with collimating secondary optics directed downward (normal to the floor) will non-uniformly illuminate the floor by directing more light normal to the floor and less to the outer angles with a significant, non-uniform fall-off in illuminance.

Light Directed at an Angle to the Primary Plane of Illumination

When luminaries are directed at an angle with respect to a primary illumination plane, the uniformity is not efficient due to the illuminance fall-off from the Cosine Law and the Inverse Square Law. The Cosine Law dictates that the illuminance over the angle for planar surfaces decreases as 1/cosine (theta) from the angular spread where theta is the angle from the luminaire or light source to the incidence plane normal. The Inverse Square Law states that the illuminance falls off by $1/r^2$ from the distance (r) between the light source to the illumination plane. Both of these contribute to the non-uniformity of the illumination, and large angles and longer distances from the source create a large illuminance non-uniformity.

Ideal Illuminance Uniformity

The illuminance spatial profile with the highest optical efficiency is a flat top, or step, illuminance profile such that the illuminance is constant across the area of interest. In order to achieve high levels of illuminance uniformity when the primary plane of incidence is at an angle with respect to the fixture, the angular light intensity distribution should pre-compensate for the specific installation or environment. This would require expensive custom tooled and molded optical elements for each specific application and condition.

Symmetric Spread Lenses

Other lenses or diffusers are sometimes added that are symmetrically refractive or diffusive such that the angular spread of the light is increased equally along two primary orthogonal axes. This can increase the illumination uniformity, but often at the expense of directing light into unwanted regions, thus reducing the illuminance in a desired region. Typically symmetric spread lenses are molded glass plates with prism patterns on at least one surface to refract light. The use of a symmetric spread lens will convert the spot illumination into a flood illumination with increased uniformity and reduced overall illuminance in the desired regions.

Asymmetric Spread Lenses

Some architectural lighting fixtures utilize asymmetric spread lenses to spread light asymmetrically such that the angular intensity along two primary orthogonal axes falls off more rapidly in one than the other. Asymmetric spread lenses, such as linear prism arrays, can be used to refract light asymmetrically, thus spreading the light more efficiently than symmetric spread lenses; however, the illuminance uniformity is still low because the output from the spread lens does not pre-compensate to account for the Cosine Law and the Inverse Square Law.

Conventional architectural lighting fixtures are far from optimal in effectively and efficiently distributing light onto target surfaces. Design tradeoffs associated with using conventional light fixture optical components make the desirable combination of wide beam spread, long optical throw, and substantially uniform distribution unobtainable. There is a need for even small improvements in further optimizing these parameters as well as luminaire efficiency. Grierson (U.S. Pat. No. 5,727,870) discloses using curved reflectors to achieve uniformity and Engel (U.S. Pat. No. 5,685,633) utilizes an asymmetric reflector to control light distribution. These reflectors require a significant amount of customization to enable the reflector to provide the often unique desired light output for a specific application and light source. Also, the illustrated metalized versions are costly to manufacture. The cost of customizing the shape and reflective properties can be very high. With the trend toward solid-state lighting where multiple LED light sources are needed, reflector geometry can get very complicated and occupy a significant amount of space behind and surrounding the light source. The efficiency and design of the system will often require each reflector to take into account the light profile from the others. Reibling (U.S. Pat. No. 4,188,657) discloses light fixtures with reflectors with different surface finishes to achieve non-symmetric output. These surface finishes are usually embossed, stamped, cast or formed into metal and are very costly to manufacture. Additionally, these features are prone to scratches during assembly or in uses and minor amounts of debris will significantly reduce their performance and cleaning is cumbersome due to particles trapped within the recesses. Wang (US 2006/0082989) proposes an array of LEDs positioned asymmetrically in order to achieve a more uniform light distribution when directing light toward an angled plane such as a wall. This arrangement has the disadvantage that the total area of the array is increased this results in a larger and more costly light fixture. Also, it does not account for the non-uniformity due to the Cosine Law and the Inverse Square Law. Rizkin et al (US 2004/0114355) describes the use of an LED array with collimation lenses to achieve a wider light distribution due to the distribution lengthwise of the LEDs. Similar to Wang, this geometry has the restriction that the array is longer in one dimension than the other and the total array of light emission is increased and the light fixture is increased in size. Harvey (US 2005 0184 28) describes a reflector designed to asymmetrical direct light onto a panel. This uses one or more complex reflectors that are costly to produce and are custom for each application. Wijbenga et al. (U.S. Pat. No. 6,568,835) describes the use of facetted parabolic reflectors to generate an asymmetric light profile. These are also very customized and expensive to produce.

SUMMARY

Embodiments of the present invention provide improved light-diffusing films, plates, and lenses that can be used in light fixtures to control the distribution of light onto illuminated objects such as walls, sculptures, and landscaping. Compared to traditional symmetrical or asymmetrical diffusers or secondary lenses, the uniformity of illumination upon a target object is significantly increased by an optical element disposed between the light source and the illumination plane. The element modifies light to improve the illuminance uniformity by improving the pre-compensation for illuminance fall-off due to the Cosine Square Law and the Inverse Square Law. For a given beam spread that distributes light perpendicular to the beam direction, the optical throw is greatly increased, resulting in more light distributed on the target surface in the beam direction. Additionally, the luminaire efficiency is improved by increasing the total light flux incident upon an illuminated target from a light fixture. Embodiments of the invention allow lower energy consumption in an individual fixture by effectively illuminating more area with less electrical power. The improved output of individual fixtures in a multi-fixture lighting system may allow for the use of fewer fixtures resulting in lower system costs. The improved solution is a thin, low-cost solution with improved performance over similar systems with spread lenses.

The described performance improvements in lighting applications are due to the unique angular scattering profiles of the volumetric, asymmetric polymer components with increased clarity. By orienting the major asymmetric diffusion plane substantially perpendicular to the illuminated surface a wide beam spread incident upon the target surface is achieved with improved illuminance uniformity. Additionally, a significant portion of the light is allowed to pass through the volumetric asymmetric diffuser without being scattered. This increases the distance between the fixture and the center of the beam pattern and allows a unique combination of wide beam spread, large optical throw, and substantially uniform intensity distribution.

DETAILED DESCRIPTION

The features and other details of particular embodiments of the invention will now be more particularly described. It will be understood that particular embodiments described herein are shown by way of illustration and not as limitations of the invention. The illustrations are not drawn to scale in order to illustrate particular features and properties. The principal features of this invention can be employed in various embodiments without departing from the scope of the invention. All parts and percentages are by weight unless otherwise specified.

DEFINITIONS

For convenience, certain terms used in the specification and examples are collected here.

"Diffuse" and "diffusing" as defined herein includes light scattering or diffusion by reflection, refraction or diffraction from particles, surfaces, or layers or regions.

"Diffuser Plate" and "Diffuser Film" and "Diffuser" are referred to herein as optical elements that provide a scattering or diffusion property to one or more light rays. The change in angle of a light ray may be due to refraction, internal forward and backward scattering, or diffraction. As suggested here a diffuser plate (or film) may be thin and may incorporate many layers or regions providing different properties. A diffuser plate may incorporate other features or materials in the volume or on one or more surfaces that impart a desired optical, thermal, mechanical, electrical, or environmental performance.

"Optical throw" as defined herein refers to the linear distance from the light fixture or light source to the region with the largest illuminance in the illumination pattern.

"Optically coupled" is defined herein as condition wherein two regions or layers are coupled such that the intensity of light passing from one region to the other is not substantial reduced by Fresnel interfacial reflection losses due to differences in refractive indices between the regions. "Optical coupling" methods include methods of coupling wherein the two regions coupled together have similar refractive indices or using an optical adhesive with a refractive index substantially near or in-between the regions or layers. Examples of "Optical coupling" include lamination using an index-matched optical adhesive, coating a region or layer onto another region or layer, or hot lamination using applied pressure to join two or more layers or regions that have substantially close refractive indices. Thermal transfer is another method that can be used to optically couple two regions of material.

"Anisotropic ratio" as defined herein refers to the ratio between the FWHM diffusion angle in the machine direction of a diffuser film and the FWHM diffusion angle in the axis perpendicular to the machine direction.

"See through" as defined herein refers to the phenomenon that can be described differently depending on the context. When one refers to scattering or diffusion in a diffractive sense, one can speak of diffraction orders, although for traditional symmetric and asymmetric diffusive mediums the non-zero diffractive orders do not have well-defined angular ranges. However, one can refer to the un-deviated light as the zero order when passing through a diffuser. One may refer to "see through" as the zeroth ordered light that is un-scattered or un-diffracted after passing through a diffusing medium. A perfectly clear film will be referred to as having significant see-through and a hazy film will be referred to as having little or no see-through. See through is also commonly referred to as specular transmission.

"Clarity" is defined as the ratio of the amount of unscattered light to transmitted light expressed as a percentage using a ring sensor at the exit port of a haze meter as defined by ASTM D1003 standard and BYK documentation referring to Transmission, Haze, and Clarity definitions. The relation between the amount of unscattered light (IC-IR) and transmitted light (IC+IR) is expressed in percentage or $$\text{Clarity} = 100\% \cdot \frac{(IC - IR)}{(IC - IR)}$$

where the light intensity in the inner ring is IC and the intensity of the light in the outer ring sensor is IR. Clarity generally refers to the amount of low-angle scattered light. It is used here as one metric to quantify "see through." The Clarity measurement effectively describes how well very-fine details can be seen through the optical element. The see-through quality is determined in an angle range smaller than 2.5 degrees and the measurement of clarity depends on the distance between sample and observed object.

"Uniformity" is defined as one minus the standard deviation divided by the arithmetic average of the values. An ideal sample with perfect uniformity will have a uniformity value of 1.

"Illumination Uniformity" is defined as the uniformity of the illuminated area.

"Illuminated area" is defined as the area enclosed by the boundary where the intensity of the illumination falls to 50% of its peak value.

"Hot spot" refers to local fluctuations that have significant luminance differences (contrast) between two neighboring regions.

Figure 1:
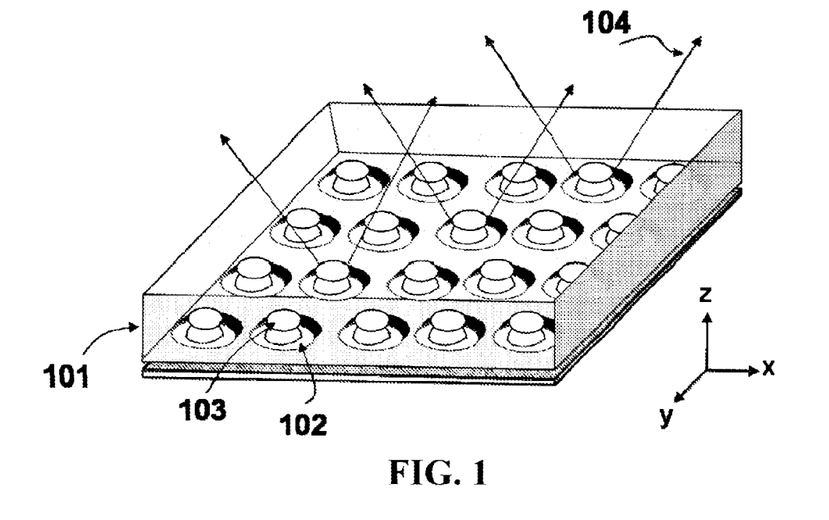
FIG. 1 is a perspective view of a traditional LED light fixture.

FIG. 1 is a perspective view of a traditional LED light fixture using LEDs with secondary lens 102 embedded within a rigid construct 101. The LEDs are placed in a linear or matrix array. The output profile of the light 103 can only be controlled by the geometry, material of the secondary lens, and other optical elements. As the array sizes increase, this approach may be costly and difficult to implement to accommodate a custom light profile distribution. Moreover, the symmetric output of the LED array with the secondary lens will not be sufficient in a case where a highly uniform and long optical throw light distribution is needed as in a typical architectural lighting application.

Figure 2:
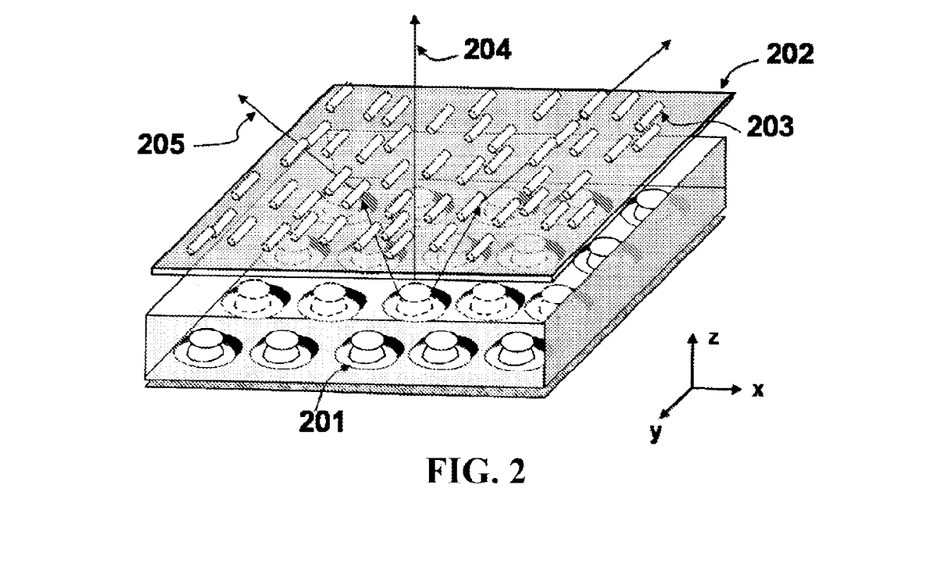
FIG. 2 is a perspective view of one embodiment of a light fixture using an enhanced lens plate.

FIG. 2 is a perspective view of one embodiment of a LED light fixture using an enhanced lens plate. The enhanced lens plate 202 includes a clear polycarbonate sheet with a high clarity anisotropic volumetric diffuser optically coupled to one surface of the sheet. The enhanced lens plate is placed on top of the whole LED array 201 as one unit. Light exiting the LEDs incident on the enhanced lens plate 202 will be scattered preferentially in one direction 205. As illustrated in FIG. 2, the asymmetrically shaped particles 203 in the volumetric anisotropic scattering diffusion film are oriented in the y direction. Thus, the light from the LED directed through the enhanced lens plate 202 will scatter into higher angles in the x-z plane than the y-z plane. The volumetric anisotropic diffuser also has a low level of backscatter, thus less light is directed back toward the light source where it could be absorbed. The enhanced lens plate 202 can be rotated to different orientations to achieve a range of output light profiles. One or more diffusers with different optical properties, such as diffusion angle, anisotropic ratio, transmission or clarity can be substituted or stacked to achieve different system output light profiles.

In one embodiment of this invention, a sufficiently rigid anisotropic volumetric diffuser is located within a light fixture without a substrate. In a further embodiment of this invention, a substrate with design surface relief features on either or both surfaces may be employed to increase the forward transmission. The surface relief features may be linear, random, array, or some combination of these and other optical refraction, diffraction, or scattering features.

Figure 3:
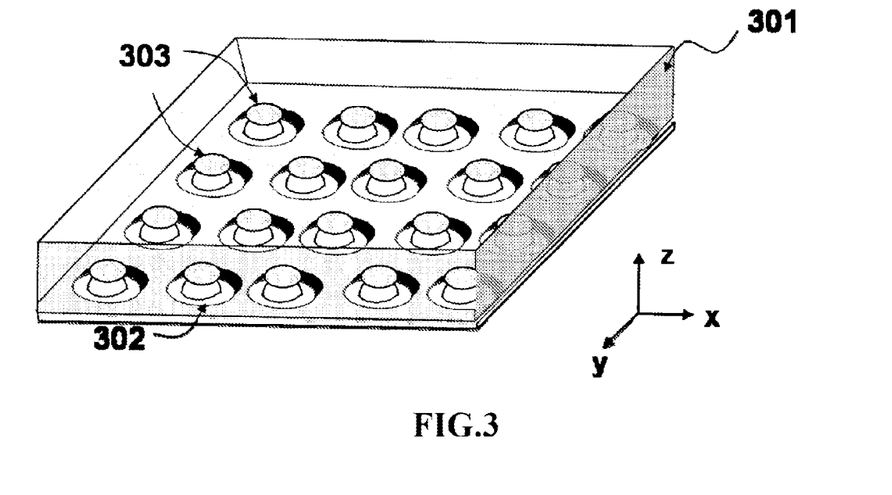
FIG. 3 is a perspective view of one embodiment of a light fixture using an LED enhanced secondary optic lens.

FIG. 3 is a perspective view of one embodiment of a LED light fixture using a LED enhanced secondary optics lens. The LED enhanced secondary optics lens is an anisotropic volumetric diffusion film 303 with an improved light scattering distribution optically coupled onto the top output surface of the individual LED 302. In contrast to the conventional secondary optics, the use of anisotropic volumetric diffusion films redirects the light coming from the LED die and transmits more light through the narrow angular range. In one embodiment, the anisotropic volumetric diffuser has a high haze. The different LEDs in the array or fixture could have different films attached with different optical properties to achieve desired results. These could include optical films or components such as collimation films, light re-directing films, louver films, reflective polarizers, polarization sensitive anisotropic scattering films, color compensation films, birefringent films, retarders, and other optical films known to be used in displays and light fixtures. In another embodiment of this invention anisotropic volumetric diffusion films are optically coupled onto the top output surfaces of a secondary optics of the individual LEDs. Normally, the existing secondary optics collimate the light and generate hotspots where removal of such high intensity regions through custom secondary optics is expensive. In an application where uniformity or a different illumination pattern is desired, attaching an anisotropic film with high clarity can be utilized along with a wide range of LEDs and a collimating secondary optic designed for the LED. This allows one to use the same LED and associated collimating secondary optic in combination with a volumetric anisotropic diffuser that is chosen for the specific application. The diffusers are interchangeable among many different applications. The addition of the single or multiple films through optical coupling or affixing or mounting separately to the secondary optics will generate efficient light-intensity profiles and increased spatial-luminance uniformities in the fixture. In a further embodiment of this invention, films having different light-scattering and directing properties are coupled to the secondary optic in two or more LEDs in an array. By choosing different optical scattering profiles for different regions, further customization of the total cumulative light output from the light-emitting device can be achieved at a low cost.

The anisotropic volumetric diffusion film may also vary depending on the location within the LED array. Films with different optical properties, such as diffusion angle, anisotropic ratio, transmission or clarity, can be substituted in locations along the arrays in combination with or with secondary lenses in order to achieve a diverse system output light profile.

Particular embodiments of the present invention are illustrated in the following Example(s). The following examples are given for the purpose of illustrating the invention, but not for limiting the scope or spirit of the invention.

Example 1

Figure 4:
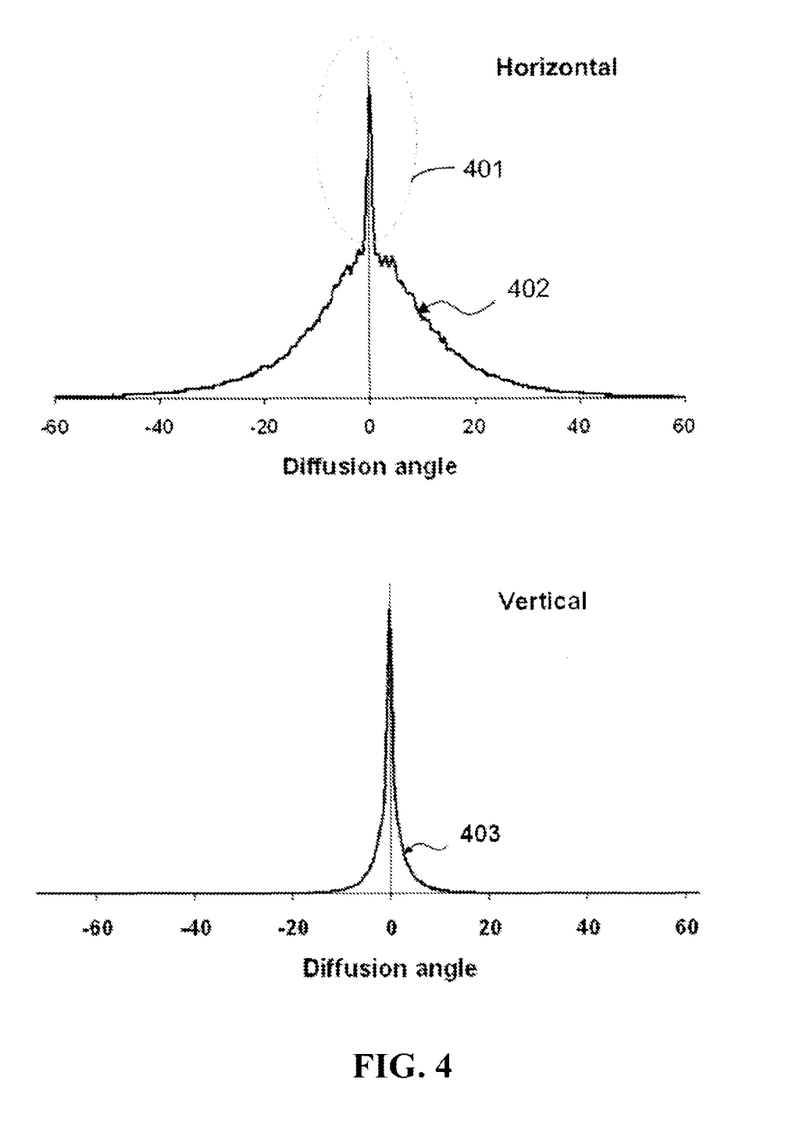
FIG. 4 is an intensity versus angle distribution in both the horizontal and vertical direction for a volumetric, asymmetric optical film utilized in the invention

An enhanced lens plate of a LED light fixture for architectural lighting is constructed as illustrated in FIG. 2. An anisotropic diffusion film of diffusion angles of 27°×6° (FIG. 9) is placed on top of a LED-array light fixture. FIG. 4 shows the horizontal 402 and vertical 403 cross section of the anisotropic diffusion film used. The see through property can be seen as narrow region 401 of the horizontal profile 402 in FIG. 4. This film diffused the incoming light and substantially transmitted the head-on specular component. This effect is best illustrated in the horizontal cross section as a sharp peak 401 seen at the center of the diffusion profile 402.

The illumination pattern has high illumination uniformity and a large optical throw due to the anisotropy and its see-through properties.

Figure 5:
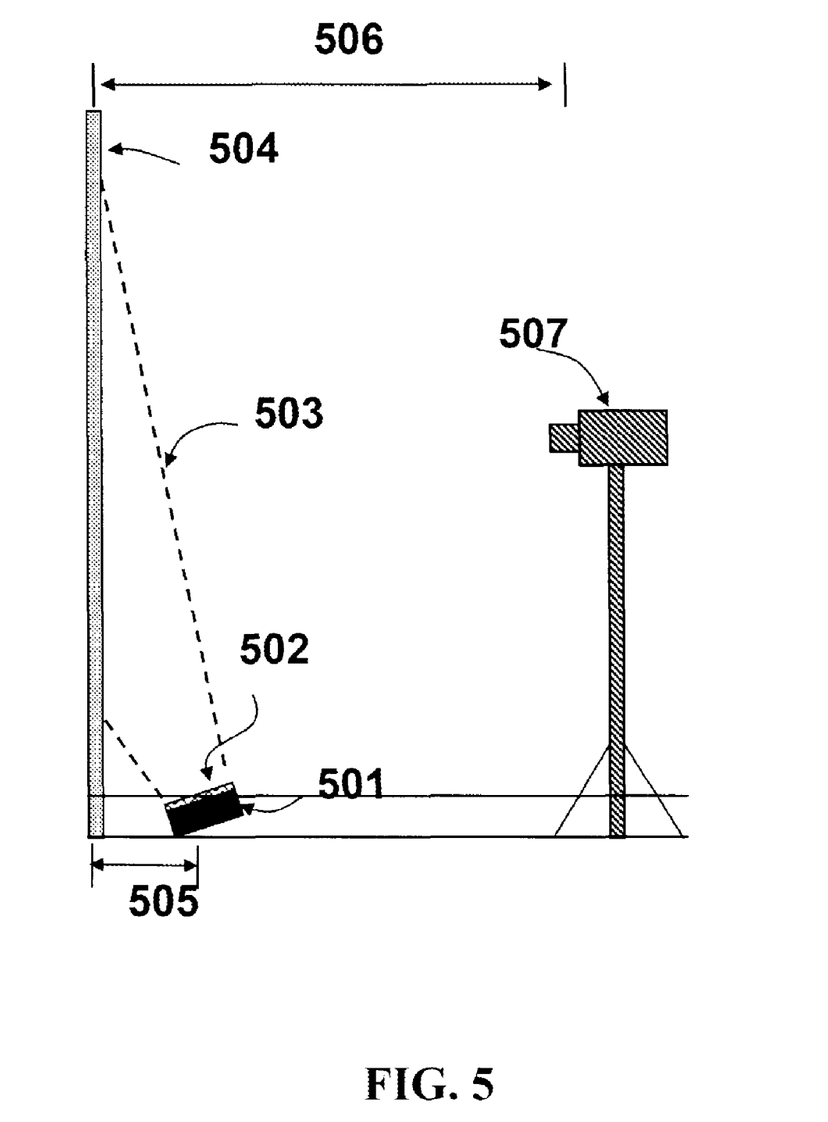
FIG. 5 shows the experimental setup used in verifying the improved performance of the invention.
Figure 6:
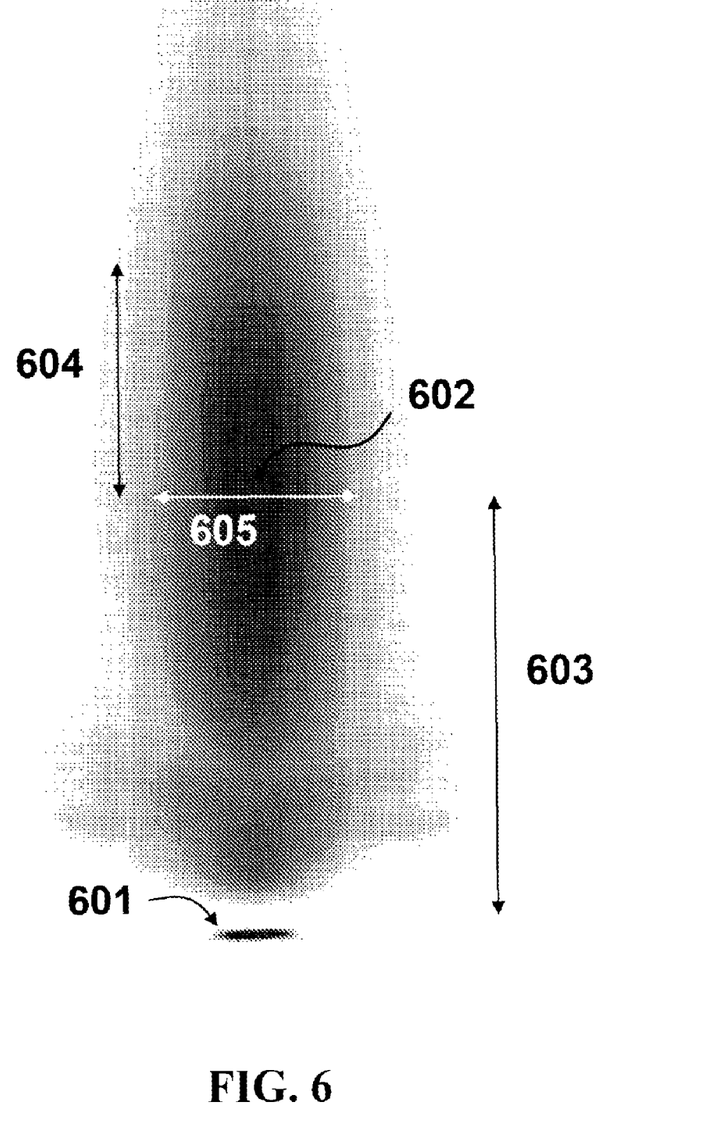
FIG. 6 is a beam pattern illustrating the parameters used in analyzing luminaire performance.

To illustrate and quantify the effect of the present invention, an illumination test setup is constructed. Referring to FIG. 5, an illumination test comparison setup comprises the LED light fixture 501, a Lambertian reflecting surface 504 and a CCD camera 507 for detection. The illuminating surface of the LED fixture is tilted 10 degrees towards the Lambertian reflecting surface from the horizontal to simulate a typical wall washing application. The Lambertian surface's optical characteristics correspond to that of a typical white wall. The CCD camera is positioned to represent a viewing position of a viewer for such application. Two symmetric diffuser films were also tested along with the said asymmetric volumetric diffuser for comparative examples. FIG. 6 illustrates the different geometrical illumination parameters measured. Optical and geometrical parameters such as optical throw 603, horizontal 605 and vertical beam spread 604, illumination uniformity and average luminous intensity are measured. The results are summarized in FIG. 8. In addition, cross sectional profiles of the illuminated pattern are plotted in FIG. 7.

Figure 7:
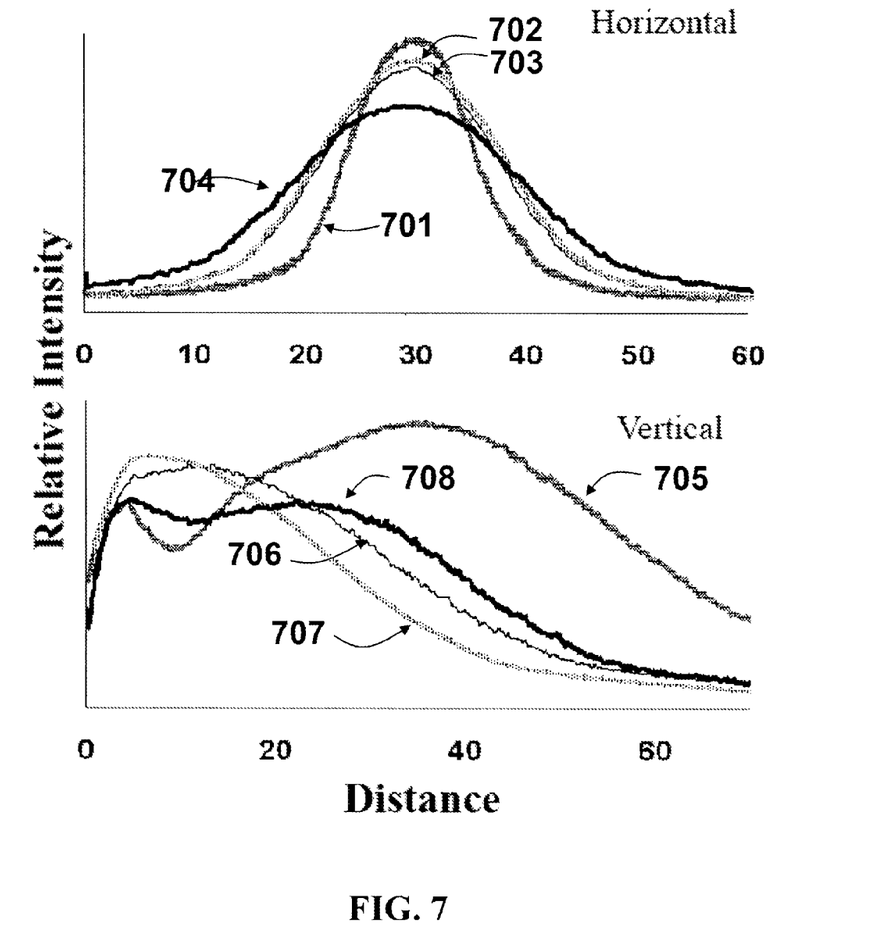
FIG. 7 is the horizontal and vertical cross section of the illuminated pattern comparisons among different configuration.

The plots in FIG. 7 represent the light profile projected onto a white wall or otherwise diffusely reflecting structure. The horizontal cross sections (701, 702, 703, and 704) and the corresponding vertical cross sections (705, 706, 707, 708) are the measured intensities across a uniform, white, substantially Lambertian reflective wall. The horizontal cross-sections are the intensities measured along a horizontal line centered vertically along the wall. The vertical cross sections are the intensities measured along a vertical line centered horizontally. A high intensity portion of a curve with lower intensities on either side, such as the central portion of 701, will appear as a hot-spot or high intensity region of non-uniformity. The horizontal cross section 701 and the vertical cross section 705 are the intensities of the light pattern along a horizontal and vertical line, respectively, of the light projected onto the wall by standard 16 degree optics on an LED array, as shown in the picture in FIG. 8(a). The horizontal cross section 702 and the vertical cross section 706 are the intensities of the light pattern along a horizontal and vertical line, respectively, of the light projected onto the wall by standard 16 degree optics plus an additional 20 degree symmetrical diffuser on an LED array as shown in the picture in FIG. 8(6). The horizontal cross section 703 and the vertical cross section 707 are the intensities of the light pattern along a horizontal and vertical line, respectively, of the light projected onto the wall by standard 16 degree optics plus an additional 40 degree symmetrical diffuser on an LED array as shown in the picture in FIG. 8(*c*). The horizontal cross section 704 and the vertical cross section 708 are the intensities of the light pattern along a horizontal and vertical line, respectively, of the light projected onto the wall by standard 16 degree optics plus an additional 27 degrees by 6 degrees anisotropic diffuser on an LED array as shown in the picture in FIG. 8(*d*).

Figure 8:
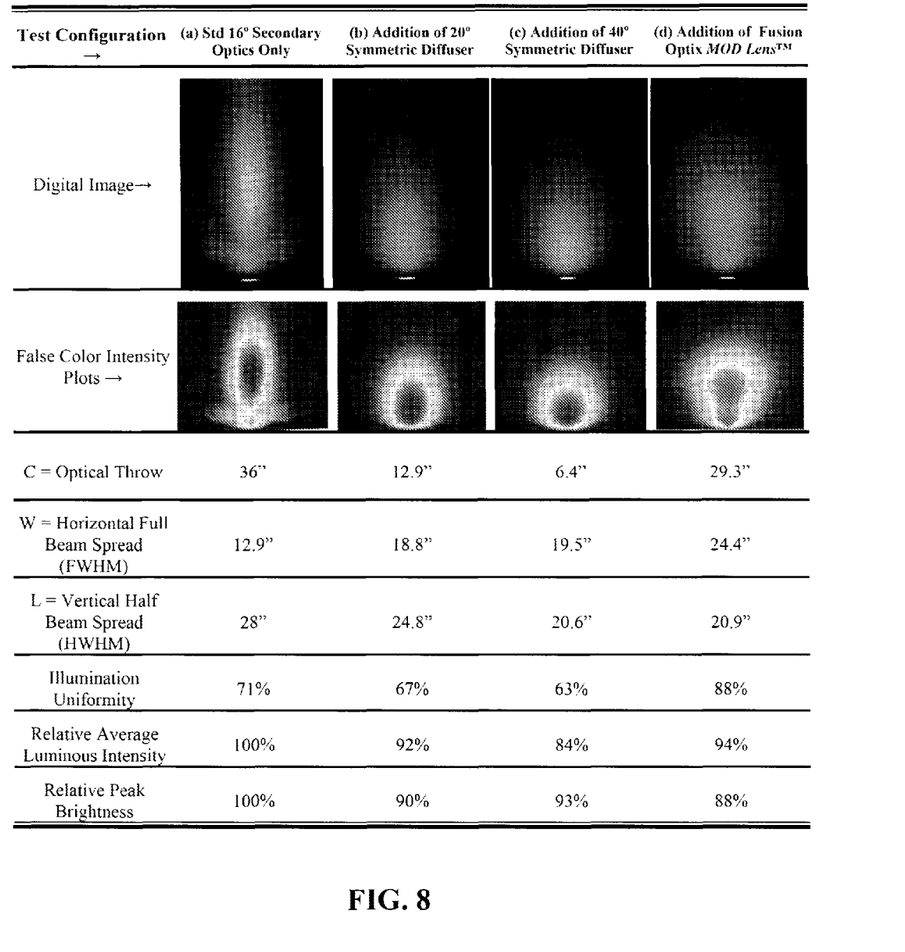
FIG. 8 is a table showing light fixture performance characteristics of an embodiment of the invention (column d) vs. other typical configurations.

A traditional LED light fixture (FIG. 1) with narrow secondary optics 103 and no other optical enhancement components will produce an oval shaped pattern onto the wall as seen in FIG. 8. The hotspots in the center of the illuminating pattern and the narrow oval shape pattern are highly undesirable for a wall washing application. The hotspot in the center is also apparent in the vertical cross sectional plot 705 of this configuration. The illumination uniformity of such fixture configuration is 71%. In an effort to widen the diffusion pattern, two different symmetric diffusers were integrated into the LED light figure as illustrated in FIG. 2. The first symmetric diffuser utilizes surface features to scatter the light and the second symmetric film uses volumetric optical elements to generate the diffusion. The diffusion angles for these two films are 20°×20° and 40°×40°, respectively. Due to the increased diffusion from the use of symmetric diffusers, the two diffusers excessively broaden the beam in the vertical direction that decreases the optical throw 706 and 707 and a hotspot is still apparent 702 and 703. The effect of using symmetric diffusers decreases the overall illuminated uniformity to 67% and 63%, respectively.

In a further embodiment, the enhanced lens plate was manufactured by adhering a volumetric asymmetric diffusion film with a specular transmission component onto a clear substrate of polycarbonate. The lens plate 502 is then applied in the same illuminating setup discussed above. The diffusion film was placed in an orientation to widen the horizontal profile of the illuminated beam on the wall. The specular transmission component ("see through") of the film 401 enhances the optical throw over the two previous configurations that use symmetric diffuser films (29" vs. 13" and 6"). In examining the illuminated cross section, the preferred embodiment has a substantially flat illumination profile in the vertical direction from a distance of 3" to 30" 708. The horizontal cross section is also broader 704 which will result in a more uniform illumination pattern. The calculated illumination uniformity improved from 71% (no enhanced plate) to 88%. With the improved uniformity, one or more such LED fixtures with the enhanced lens plate attached can be placed side by side to produce a broader flat illumination pattern on the wall in a tiling configuration.

Figure 9:
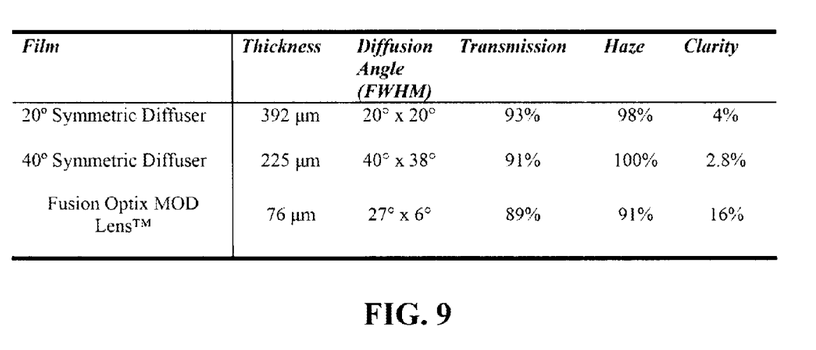
FIG. 9 is a table showing diffuser performance characteristics of an embodiment of the invention (Fusion Optix MOD Lens™) vs. two typical commercial diffusers.

The properties and the composition of an embodiment the diffusion film will now be discussed. A light-scattering film with anisotropic scattering profile was prepared by blending and extruding a mixture of 70% polyester and 30% polyethylene into a film and stretching the film to achieve asymmetric dispersed phase domains within a 76 micron region, as described in U.S. Pat. No. 5,932,342. As shown in FIG. 4, collimated light passing through this film preferentially scatters more in the horizontal direction than in the vertical direction. A method of making the film is in accordance with published US Patent Application US20060056021A1. FIG. 9 compares the optical properties of this anisotropic volumetric diffuser film with the other two symmetric diffuser films used in this Example. The anisotropic diffuser film used is thinner, has a higher anisotropic ratio, and a higher clarity value. Another unique feature of this diffuser film is the see-through phenomenon. In looking at the horizontal cross-section plot of this film, there is a general haze or diffusion component with a sharp specular component at the center. This allowed the system to have significant diffusion while maintaining some head-on low angle transmission. Clarity is one metric used to quantify the "see through" phenomenon. The proposed film has a higher clarity value than the symmetric alternatives. Other methods for quantifying the see through include computing the ratio of the average intensity from a scattering profile curve along one or more axes within a small central angular range centered around 0 degrees to the average intensity along an angular range 1 or more degrees larger than the central range. In one embodiment, the central angular range is chosen from one of the following angles: −4° to 4°, or −3° to 3°, or −2° to 2°. In particular embodiments of this invention, this ratio is greater than 1.25, 1.5, 2, 3, 4, or 5. In additional embodiments of this invention, the improved performance is generated from a volumetric anisotropic diffuser with a ratio of clarity to diffusion (C/H ratio) greater than 0.05, 0.1, 0.2, 0.3, 0.4, or 0.5.

In a further embodiment of this invention, improved illuminance uniformity can be achieved efficiently with an anisotropic volumetric diffuser that is oriented at an angle, theta, to the primary illuminance plane. The fall-off due to the Inverse Square Law will generally create a higher intensity region at the lower portion of the wall since it is a shorter distance to the light source. In one embodiment of this invention, the diffuser is oriented at an angle, theta, to the wall, such that the light from the light source to the lower (or closer) region of the wall will effectively pass through an effectively thicker region of the diffuser due to a steeper angle of incidence. Since the light will pass through an effectively thicker diffuser, this light will be scattered more than the light from the light source directed to the upper portion (or further) region of the wall because this travels a shorter distance through the diffuser. In a further embodiment of this invention, theta is an angle between 5 degrees and 85 degrees. In a another embodiment of this invention, the angle, theta, is chosen from a set of angular ranges consisting of 10 to 80 degrees, 20 to 70 degrees, 30 to 60 degrees and 40 to 50 degrees. In a further embodiment, a substantially planar array of LEDs is used as a light source and the diffuser is oriented at an angle, alpha, to the optical axis of one or more of the emitting LEDs such that alpha is between 5 and 85 degrees. In a another embodiment of this invention, the angle, alpha, is chosen from a set of angular ranges consisting of 10 to 80 degrees, 20 to 70 degrees, 30 to 60 degrees and 40 to 50 degrees. In one embodiment, the angle, gamma, of the substantially planar anisotropic volumetric diffusing region relative to the primary illumination surface is selected from gamma>30°, gamma>40°, gamma>50°, gamma>60°, gamma>70°, or gamma>80°.

Additionally, embodiments of the invention provide greater transmission of light resulting in efficiency improvement because the high clarity increases the forward transmission relative to a traditional volumetric anisotropic diffusing region. Also, embodiments of the invention provide greater optical throw by allowing a significant portion of light to be transmitted without scattering.

The improved diffuser film, plate, or lens may contain one or more asymmetric light scattering regions containing asymmetric particles that may vary between 0.1 and 100 microns in size in the smaller dimension. The light-scattering regions may be substantially orthogonal or parallel in their axis of alignment. The diffuser film, plate or lens may allow a significant portion of light to transmit without scattering. The invention can be used in combination with components, layers, or features including diffusers, collimating films, light sources, reflectors, lenses, and other known elements of a lighting fixture to efficiently produce desirable distributions of light in architectural lighting applications. For architectural lighting applications, desirable distributions typically have more uniformity and optical throw than typically achievable with conventional light fixture optics.

The optical element used in the light fixture of one embodiment of this invention may be manufactured by extrusion or casting techniques and may be embossed, stamped, or compression molded in a suitable film or diffuser plate material containing asymmetric particles substantially aligned in one direction. The diffuser film, plate, or lens may be used with one or more light sources, reflectors, collimating films or symmetric or asymmetric scattering films to produce a light fixture. Embodiments of the invention fabricated as film can be laminated or otherwise attached to plates, reflectors, or primary or secondary lens components used in light fixtures and solid state light fixtures. In this manner a film embodiment of the invention can be converted into a transmissive plate, reflector, or molded lens component. Embodiments of the invention fabricated as film can also be converted to a molded optical component by insert molding. Transmissive embodiments of the invention can be converted to reflective embodiments by the addition of a reflective surface by coating or lamination.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/20^{th}$, $1/10^{th}$, $1/5^{th}$, $1/3^{rd}$, $1/2$, etc, or by rounded-off approximations thereof, within the scope of the invention unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. An illumination device comprising:
   a) at least one light emitting source;
   b) a volumetric light scattering layer disposed to receive light from the light source,
   c) said volumetric light scattering layer having a specular transmission component of greater than 5%,
   d) said volumetric light scattering layer having a clarity greater than 8%,
   whereby an illumination pattern generated by said illumination device incident upon a three dimensional object or a substantially planar surface is increased in either uniformity or optical throw or both uniformity and optical throw.

2. The illumination device of claim 1 wherein the light fixture has an illuminance uniformity in the illuminated area of greater than 80%.

3. The illumination device of claim 1 wherein the light scattering layer anisotropically scatters light.

4. The illumination device of claim 1 wherein the light scattering layer has a haze greater than 90%.

5. The illumination device of claim 1 wherein at least one light source is a light emitting diode.

6. The illumination device of claim 5 wherein at least one light source is an array of light emitting diodes.

7. The illumination device of claim 1 wherein at least one light source is an organic light emitting diode.

8. The illumination device of claim 1 wherein the illumination device is a light fixture.

9. The illumination device of claim 8 wherein the illumination device is an architectural light fixture.

10. The illumination device of claim 1 further comprising a substantially non-scattering waveguide wherein the illumination device is substantially planar and the optical axis of at least one light source is substantially parallel with the light scattering layer and incident on at least one edge of the waveguide such that it is arranged in an edge-illuminated configuration.

11. An illumination device comprising:
   a) at least one light emitting source;
   b) a volumetric light scattering layer disposed to receive light from the light source;
   c) said volumetric light scattering layer having a specular transmission component of greater than 5%,
   d) said volumetric light scattering layer having a clarity greater than 8%,
   e) a secondary optic disposed in an optical path between at least one light source and the light scattering layer wherein the secondary optic increases the collimation of the light from the light source in at least one plane;
   whereby an illumination pattern generated by said illumination device incident upon a three dimensional object or a substantially planar surface is increased in either uniformity or optical throw or both uniformity and optical throw.

12. The illumination device of claim 11 wherein the secondary optic collimates the light in two orthogonal planes to a full-width-half maximum of less than or equal to 16 degrees.

13. The illumination device of claim 11 wherein the light fixture has an illuminance uniformity in the illuminated area of greater than 80%.

14. The illumination device of claim 11 wherein the light scattering layer anisotropically scatters light.

15. The illumination device of claim 11 wherein the light scattering layer has a haze greater than 90%.

16. The illumination device of claim 11 wherein at least one light source is a light emitting diode.

17. The illumination device of claim 16 wherein at least one light source is an array of light emitting diodes.

18. The illumination device of claim 11 wherein at least one light source is an organic light emitting diode.

19. The illumination device of claim 11 wherein the illumination device is a light fixture.

20. The illumination device of claim 19 wherein the light fixture is an architectural light fixture.

* * * * *